(12) United States Patent
Wilkinson (10) Patent No.: US 7,725,388 B2
(45) Date of Patent: May 25, 2010

(54) VERIFICATION OF ELECTRONIC FINANCIAL TRANSACTIONS

(75) Inventor: Mark Wilkinson, Woronora Hts (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 1881 days.

(21) Appl. No.: 10/430,361

(22) Filed: May 5, 2003

(65) Prior Publication Data

US 2004/0225601 A1    Nov. 11, 2004

(51) Int. Cl.
G06Q 30/00    (2006.01)
(52) U.S. Cl. .............................. 705/39; 705/40; 705/44
(58) Field of Classification Search ............. 705/39–44; 713/150–194
See application file for complete search history.

(56) References Cited

U.S. PATENT DOCUMENTS

| | | | | |
|---|---|---|---|---|
| 4,479,112 | A * | 10/1984 | Hirsch ......................... | 380/52 |
| 4,502,048 | A | 2/1985 | Rehm | |
| 5,276,314 | A * | 1/1994 | Martino et al. ............. | 340/5.27 |
| 5,608,387 | A * | 3/1997 | Davies ....................... | 340/5.27 |
| 5,815,083 | A * | 9/1998 | Patarin et al. .............. | 340/5.27 |
| 5,949,348 | A * | 9/1999 | Kapp et al. .................. | 340/5.4 |
| 6,209,102 | B1 * | 3/2001 | Hoover ........................ | 726/18 |
| 6,209,104 | B1 * | 3/2001 | Jalili ........................... | 726/18 |
| 6,253,328 | B1 * | 6/2001 | Smith, Jr. ..................... | 726/18 |
| 6,434,702 | B1 * | 8/2002 | Maddalozzo et al. .......... | 726/17 |
| 6,549,194 | B1 * | 4/2003 | McIntyre et al. ............. | 345/173 |
| 2002/0188872 | A1 * | 12/2002 | Willeby ....................... | 713/202 |
| 2003/0074318 | A1 * | 4/2003 | Allgeier et al. ................ | 705/44 |
| 2004/0030934 | A1 * | 2/2004 | Mizoguchi et al. .......... | 713/202 |

FOREIGN PATENT DOCUMENTS

| | | |
|---|---|---|
| EP | 0 564 832 A1 | 10/1993 |
| EP | 0 965 961 A1 | 12/1999 |
| FR | 2622322 | 4/1989 |
| FR | 2684778 | 6/1993 |
| FR | 2693809 | 1/1994 |
| FR | 2819067 | 7/2002 |

OTHER PUBLICATIONS

Communication Pursuant to Article 96(2) EPC, EP Application No. 04 751 692.7—1238, European Patent Office, Feb. 14, 2007, pp. 1-6.
PCT International Search Report, PCT/US2004/014425, Sep. 3, 2004, pp. 4.
EP 04751692.7, Decision to Refuse a European Patent Application dated Dec. 14, 2009 (51 pages).
EP 04751692.7, Summons to Attend Oral Proceedings Pursuant to Rule 115(1) EPC (including annex) dated Aug. 12, 2009 (37 pages).

* cited by examiner

*Primary Examiner*—James P Trammell
*Assistant Examiner*—Hai Tran (57) ABSTRACT

Techniques are provided for verifying an electronic financial transaction. In certain implementations, verifying an electronic financial transaction includes generating a user interface including a security code, the user interface associating different portions of the code with different parts of a user input device, and associating at least one code portion with a user input device part having visual indicia dissimilar to the visual representation of the code portion. Verifying an electronic financial transaction also includes detecting activation of the user input device in a manner that generates a code, and determining whether the generated code corresponds to the security code.

44 Claims, 6 Drawing Sheets

VERIFICATION OF ELECTRONIC FINANCIAL TRANSACTIONS

TECHNICAL FIELD

This description relates to verifying electronic financial transactions.

BACKGROUND

The use of memory-containing cards for electronic commerce is becoming more and more commonplace. A common example of such cards is the Automated Teller Machine (ATM) card. Unfortunately, as more data is stored on such cards and/or more functions are performed using such cards, their attractiveness to criminals has only continued to grow.

SUMMARY

Techniques are provided for verifying an electronic financial transaction. In one general aspect, verifying an electronic financial transaction includes generating a user interface including a security code. The user interface associates different portions of the code with different parts of a user input device, at least one code portion associated with a user input device part having visual indicia dissimilar to the visual representation of the code portion. When activation of the user input device in a manner that designates a code is detected, a determination is made as to whether the generated code corresponds to the security code. The verification may be performed by machine, hand, logical instructions, or otherwise.

Particular implementations also may include detecting a financial transaction card, generating a user interface including a query for a second security code, detecting activation of a user input device in a manner that generates a code, and generating a message to have the detected code validated. The financial transaction card may include a magnetic strip that stores card owner identity data. Certain implementations additionally may include inserting the portions of the security code into the user interface in a randomized order. The portions may be randomized or received in a randomized order. Moreover, the order may change each time the code is inserted.

The security code may be a sequence of numerals. In certain implementations, symbols that are comparable to the code portions but that are not part of the security code are associated with different parts of the user input device by the user interface. The parts of the user interface device may be ATM function selection keys, for example.

In another general aspect, verifying an electronic financial transaction includes receiving a message including identity data for an electronic financial transaction, retrieving a security code associated with the identity data, the security code for presentation in a user interface that associates different portions of the code with different parts of a user input device, with at least one code portion being associated with a user input device part having visual indicia dissimilar to the visual representation of the code portion, and generating a message including the security code. The verification may be performed by machine, hand, logical instructions, or otherwise.

In certain implementations, verifying an electronic financial transaction also includes randomizing the order of the portions of the security code and inserting the randomized order into the message along with the security code. Verifying an electronic financial transaction may include inserting symbols that are comparable to the code portions but that are not part of the security code into the randomized order. In some implementations, verifying an electronic financial transaction also includes determining whether the security code is required.

In another general aspect, a system for verifying an electronic financial transaction includes a remote financial transaction station and a financial transaction manager. The remote financial transaction station is operable to detect a financial transaction card including a magnetic strip storing card owner identity data, read the data from the card, generate a user interface including a query for a first security code, and detect activation of a user input device in a manner that generates a code. The station is also operable to generate a message including card owner identity data and the generated code, receive a response message, determine whether the generated code was validated, and if the code was validated, determine whether a second security code was received in the response message. The station is further operable to generate, if a second security code was received, a user interface including the second security code, the user interface associating different portions of the code with different parts of a user input device, and associating at least one code portion with a user input device part having visual indicia dissimilar to the visual representation of the code portion, the portions of the code in a random order in the user interface, and including symbols that are comparable to the code portions but that are not part of the security code so that the symbols are associated with different parts of the user input device. The station is additionally operable to detect activation of the user input device in a manner that generates a second code and to determine whether the generated code corresponds to the second security code.

The financial transaction manager is operable to receive the message including the card owner identity data and the generated code, to determine whether the generated code is valid by examining a card file, and, if the generated code is valid, to determine whether the second security code is required. If the second security code is required, the manager is operable to retrieve the second security code, which is associated with the identity data, to randomize the order of the portions of the second security code, to insert into the randomized order symbols that are comparable to the code portions but that are not part of the security code, and to generate a message including the second security code and the randomized, symbol-inserted version of the second security code.

The described techniques may be used to combat "skimming" at Automated Teller Machines (ATMs). Skimming involves criminals using a small camera strategically placed on the ATM fascia and a card reading device fitted over the card reader slot. The criminal is thereby able to obtain the data stored on the ATM card as the card is inserted into the card reader slot and the card owner's personal identifier number (PIN) as the PIN is entered into the numeric keypad. With this information, the criminal may produce another ATM card with the original card's data and use it along with the PIN to surreptitiously manipulate the card owner's account. The described techniques, however, may make it more difficult to capture the PIN and/or other security code.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

The verification of electronic financial transactions includes verifying security codes for users of magnetic-strip cards by associating at least one portion of a security code with a user input device part having visual indicia dissimilar to the portion of the code. This is useful for deterring fraud at electronic financial transaction devices such as ATMs where criminals may observe card users using numeric keypads. However, the verification of electronic financial transactions includes verifying security codes for any type of transaction initiation for an electronic financial transaction.

Figure 1:
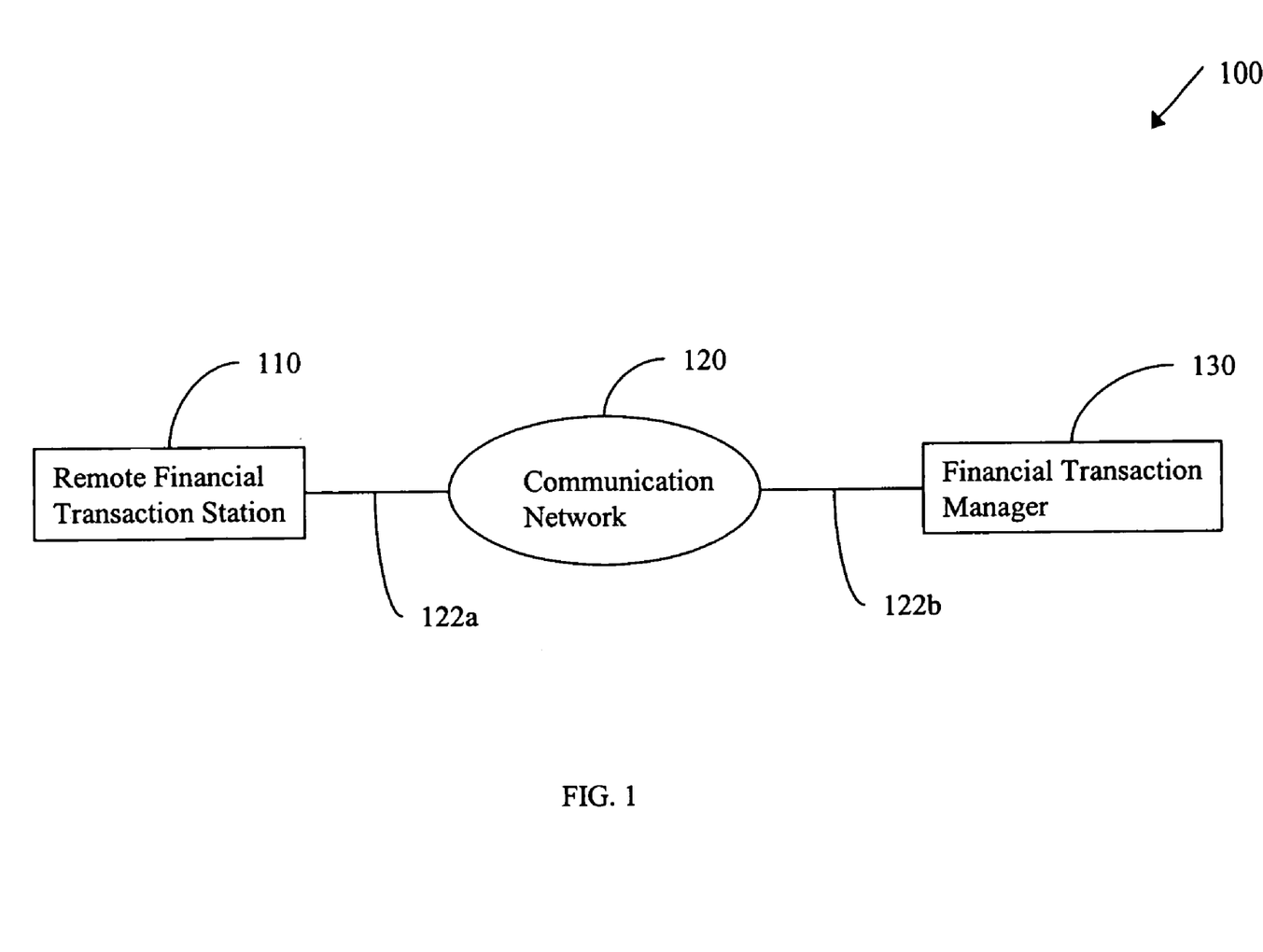
FIG. 1 is a block diagram illustrating a system for verifying an electronic financial transaction.

FIG. 1 illustrates a system 100 for verifying an electronic financial transaction. In general, system 100 includes a remote financial transaction station 110, a communication network 120, and a financial transaction manager 130. In operation, remote financial transaction station 110 receives a request for an electronic financial transaction from a user and uses data from financial transaction manager 130 to verify the acceptability of the user. Electronic financial transactions may include, for example, the withdrawal, transfer, deposit, or verification of funds.

In more detail, remote financial transaction station 110 includes at least one device for obtaining financial transaction data from a user. For example, station 110 may include a financial transaction card interface device for extracting data from a financial transaction card and a user input device for receiving additional data from a user. A financial transaction card may be an Automated Teller Machine (ATM) card, a debit card, a smart card, or any other type of device that stores data. The data may include the card owner's name, account number, social security number, user name, and/or any other appropriate information. A user input device may include a keypad, a keyboard, a touch screen, a trackpad, a microphone, and/or any other appropriate device for detecting input from a user. Through the user input device, a user may enter a name, account number, security code, or any other appropriate information.

Station 110 also includes a processor for analyzing the data and generating and analyzing messages from financial transaction manager 130. Station 110 additionally includes a communication network interface device for receiving communications from and sending communications to communication network 120, memory for storing the data and the communications, and a display device for visually presenting information to a user. The processor may be a digital processor, an analog processor, a biological processor, an atomic processor, and/or any other type of device for manipulating information in a logical manner. The communication network interface device may be a modem, a transceiver, a network interface card, or any other appropriate type of device for sending communications to and receiving communications from communication network 120. The memory may include random access memory (RAM), read-only memory (ROM), compact-disk read-only memory (CD-ROM), registers, and/or any other appropriate volatile or non-volatile information storage device. The memory may also store other information and/or instructions for station 110. The display device may be a cathode ray tube (CRT) display, a liquid crystal display (LCD), a projector, or any other appropriate type of device for visually presenting information.

In general, remote financial transaction station 110 may be any type of device that can initiate an electronic financial transaction. In particular implementations, station 110 may be an ATM or a point-of-sale (POS) device.

Remote financial transaction station 110 and financial transaction manager 130 are coupled to communication network 120 by links 122. Links 122 may be metallic wire, such as, for example, twisted pair wire or coaxial cable, fiber-optic cable, radio frequency (RF) wireless channels, infrared (IR) wireless channels, and/or any other appropriate type of wireline or wireless path for transferring information.

Communication network 120 may be any appropriate type of communication network. For example, network 120 may be an IEEE 802.3 network, an IEEE 802.5 network, an IEEE 802.11 network, or any other type of local area network (LAN). Furthermore, communication network 120 may be an X.25 network, a frame relay network, an ATM network, the Public Switched Telephone Network (PSTN), the Internet, or any other type of wireline or wireless packet-switched or circuit-switched communication network. Note that communication network 120 may contemporaneously convey communications between any of a variety of communication devices, such as, for example, personal computers, servers, and/or telephones.

Like station 110, financial transaction manager 130 also includes a communication network interface device, a processor, and memory. The communication network interface device allows manager 130 to exchange messages with remote financial transaction station 110. The processor analyzes and responds to the messages. The memory contains card owner identity data and associated security codes.

In one mode of operation, a user provides identifying data to remote financial transaction station 110. The data may be provided by producing a financial transaction card having the data encoded on a magnetic strip, by entering the data through a user input device, or by any other appropriate technique. The data may include a card owner's name, account number, address, user name, social security number, and/or other appropriate identifying information.

After receiving the identifying data, remote financial transaction station 110 generates a user interface including a query for a security code. The user interface may be textual, graphical, or any other appropriate format. The security code may include numerals, letters, or any other appropriate symbols, and may be received through a user input device.

After detecting the security code, station 110 validates the security code. This may be accomplished, for example, by sending the code through communication network 120 to financial transaction manager 130. Financial transaction manager 130 then determines whether the security code corresponds to one associated with the user identifying data, and sends an appropriate response message back to station 110. As another example, manager 130 may send a security code associated with the identifying data to station 110, and station 110 may determine whether the detected security code corresponds to the security code from manager 130. The messaging between station 110 and manager 130 may or may not be encrypted.

If the detected security code is not valid, station 110 again queries for the security code. If, however, the detected security code is valid, station 110 determines whether a message including a second security code has been received. This message typically comes from financial transaction manager 130, where the security code may be stored in a card file or other appropriate apparatus. In other implementations, the message originates from any appropriate location.

Station 110 then generates a user interface including the second security code. The code, however, is separated into portions, with each portion associated with a different part of the user input device, such as, for example, the keys on a keypad. The association may be made by location of the code portions, written descriptions accompanying the code portions, or any other appropriate technique. Furthermore, at least one of the code portions is associated with a user input device part having visual indicia dissimilar to the displayed representation of the portion. As an example, the numeral "5" could be associated with a key labeled "Enter," a key labeled "6," or a key that has no visual indicia. In particular implementations, the security code is a numeric code, and each numeral is associated with a different function selection key of an ATM by displaying the numeral next to the appropriate key. The user interface allows a user of station 110 to understand which parts of the user input device to activate to enter the second security code while not making the entire security code correspond to visually similar parts of the user input device.

Station 110 then waits for activation of the user input device in a manner that generates a code. Upon detecting such an activation, station 110 determines whether the detected code corresponds to the second security code. If it does, the electronic financial transaction may proceed.

The system illustrated by FIG. 1 has a variety of features. For example, by providing a second verification, security for electronic transactions in general is enhanced. Furthermore, by associating portions of the second security code with parts of the user input device having visual indicia dissimilar to the portions, the ability of criminals to obtain a user's security code is diminished.

Although FIG. 1 illustrates a system for verifying an electronic financial transaction, other implementations may include less, more, and/or a different arrangement of components. For example, a system may include any number of remote financial transaction stations and financial transaction managers. As another example, a financial transaction station may be located with, or even possibly a part of, the financial transaction manager. As a further example, financial transaction manager 130 may be coupled to other financial transaction managers through an interchange to permit data sharing between institutions.

Furthermore, other implementations may include less, more, or a different order of operations. For example, the order in which the portions of the code are associated with parts of the user input device may be randomized by station 110 or manager 130. This further diminishes the chance of capture by a criminal by having the second security code portions associated with different user input device parts each time. Additionally, other symbols that are comparable to the second security code portions but that are not part of the security code may be presented in the user interface, leading to enhanced security due to more possible combinations. Furthermore, the second security code and its associated operations may serve as the only validation technique for an electronic financial transaction. Also, the second security code may be sent with or after the transaction approval message.

Figure 2:
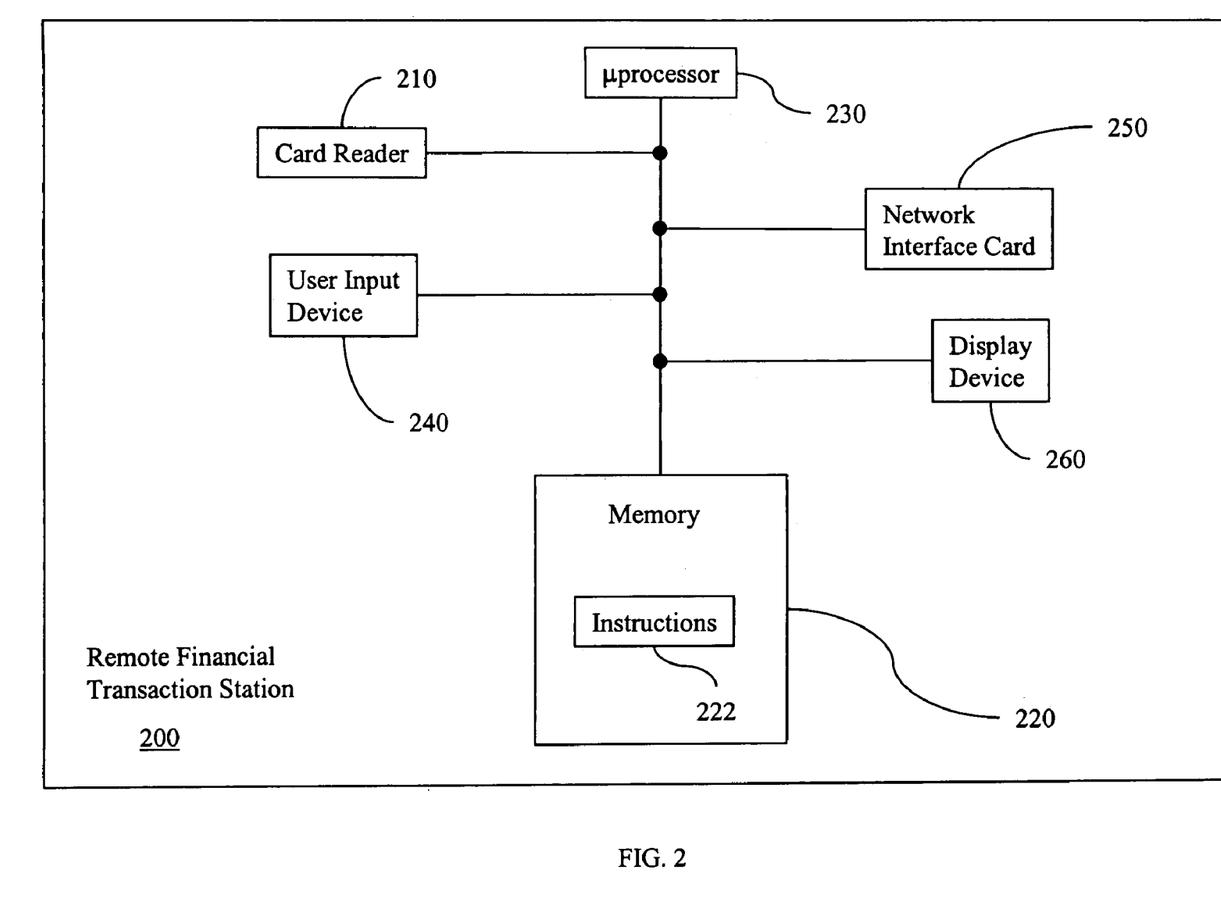
FIG. 2 is a block diagram illustrating a remote financial transaction station.

FIG. 2 illustrates a remote financial transaction station 200 similar to remote financial transaction station 110 of FIG. 1.

As illustrated, station 200 includes a card reader 210, memory 220, a microprocessor 230, a user input device 240, a network interface card 250, and a display device 260. Card reader 210 is able to detect an identification card and read the identity data on the card, whether in magnetic, optical, or other form. Memory 220 may include RAM, ROM, CD-ROM, registers, and/or any other type of volatile or non-volatile information storage device. Memory 220 stores instructions 222, which are responsible for the financial transaction operations of station 200. Microprocessor 230 may be a complex instruction set computer (CISC), a reduced instruction set computer (RISC), or any other appropriate device for manipulating information in a logical manner. Microprocessor operates, at least in part, according to instructions 222. User input device 240 may include a mouse, a trackball, a keyboard, a keypad, a light pen, a stylus, a touch screen, a microphone, and/or any other appropriate device for detecting input from a user. Microprocessor 230 responds to signaling from user input device 240. Network interface card 250 may be an Ethernet card, an Asynchronous Transfer Mode card, or any other appropriate device for sending messages to and receiving messages from a financial transaction manager. Display device 260 may be a CRT display, an LCD, a projector, or any other appropriate device for presenting visual information.

In one mode of operation, station 200 waits to detect the presence of a financial transaction card. Upon detecting such a presence, card reader 210 reads the identifying data stored on the card. The data typically includes the card owner's name and account number.

After receiving the card owner's identifying data, microprocessor 230 generates a user interface including a query for a security code associated with the identifying data. The user interface is visually presented by display device 260. Station 200 then waits for activation of user input device 240, which is interpreted to correspond to a security code that may include numerals, letters, and/or any other appropriate symbols.

After user input device 240 detects entry of the security code, microprocessor 230 validates the detected security code. This may be accomplished, for example, by generating a message including the code and sending the code through network interface card 250 to a financial transaction manager, which then determines whether the code corresponds to a security code associated with the identifying data and sends an appropriate response message back to station 200.

If microprocessor 230 determines that the entered security code is valid, the microprocessor determines whether a message including a second security code has been received. Such a code would typically come from the financial transaction manager and could be a part of any appropriate message.

If a second security code has been received, microprocessor 230 generates a user interface including the second security code. The code, however, is separated into portions, with each portion associated with a different part of the user input device, such as, for example, the function selection keys next to a display device of an ATM. Furthermore, at least one of the code portions is associated with a user input device part having indicia dissimilar to the displayed representation of the portion.

Station 110 then waits for activation of the user input device in a manner that generates a code. Upon detecting activation, station 110 determines whether the detected code corresponds to the second security code. If it does, the electronic financial transaction may proceed.

Note that the second security code could be printed on the financial transaction card or, perhaps more securely, could be something such as the card owner's date of birth, which would allow for easier recall.

Figure 3:
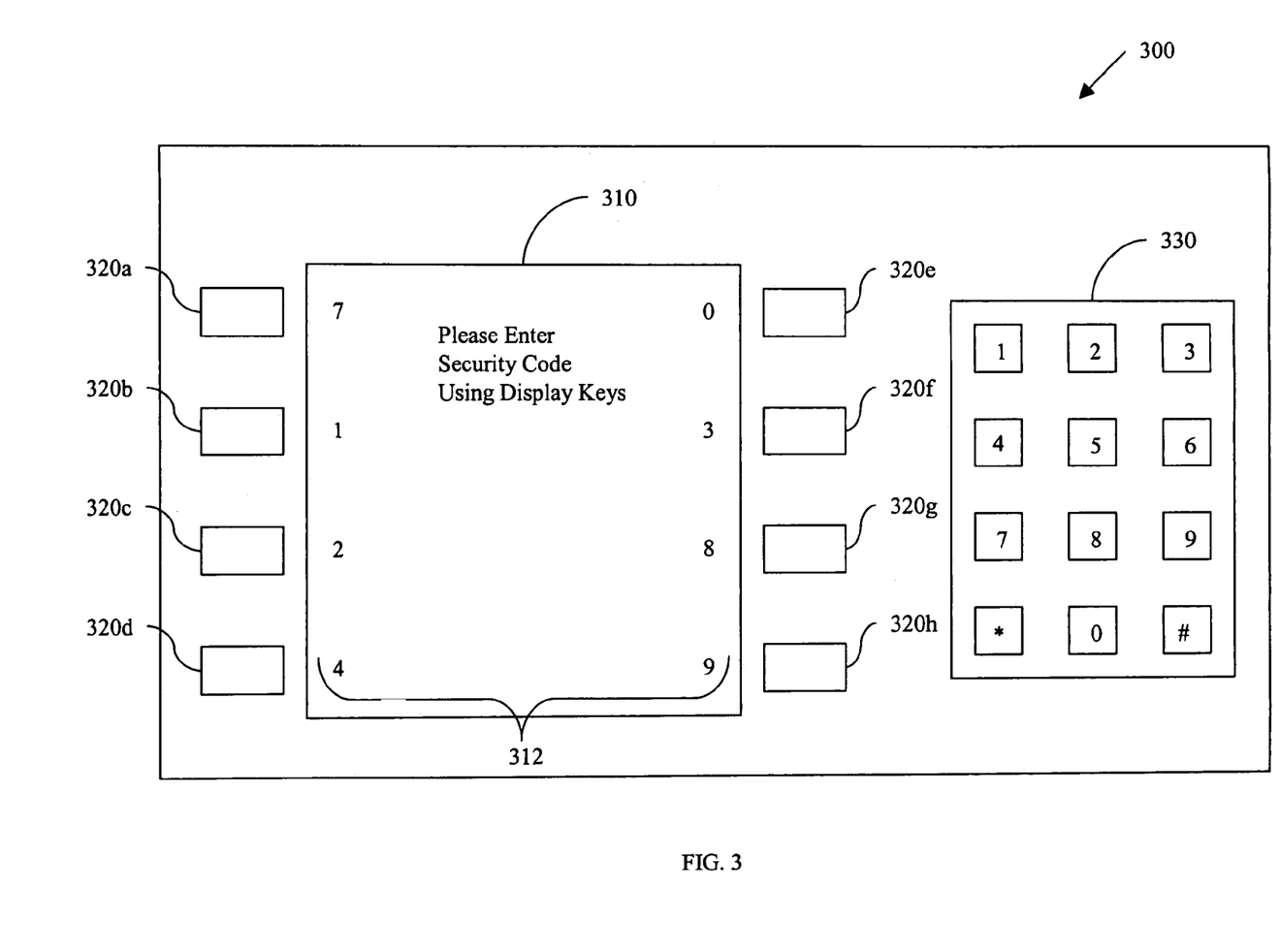
FIG. 3 illustrates a user interface system for verifying an electronic financial transaction.

FIG. 3 illustrates a user interface system 300 that may be useful for remote financial transaction station 200 in FIG. 2. As illustrated, system 300 includes a display device 310, function selection keys 320, and a keypad 330. Display device 310 is operable to display any appropriate type of information. Function selection keys 320 and keypad 330, which are both part of the user input device, are operable to detect user activation of the keys.

In operation, display device 310 presents a user interface 312 that prompts a user to enter a security code. In this case, however, portions of the security code are included in the user interface in a random order and associated with function selection keys 320, as illustrated. For example, the numeral "7" is associated with function selection key 320a, and the numeral "9" is associated with function selection key 320h. Thus, by activating the appropriate function selection keys 320, a user may enter the requested security code. As shown, function selection keys 320 include no indicia. In other implementations, they may include indicia.

In particular implementations, the symbols that represent the security code portions may appear in the user interface in random order along with comparable symbols that are not part of the security code. For example, assume that a security code is "3921" for the illustrated system. Thus, the numerals "7", "4", "0", and "8" are symbols that, though not part of the security code, are comparable to the symbols of the security code.

The implementation illustrated by FIG. 3 has the advantage that a single camera positioned to record normal PIN entry using numeric keypad 330 would probably not be able to also record the data on display device 310. Furthermore, the chance of this happening can be further reduced by using a privacy filter, which is a mechanism that makes information displayed by the display device only available for a user directly facing the display device. While the camera might be able to record the movement of the user's fingers and, accordingly, determine which keys had been activated, the random assignment of numerals to keys keeps the actual security code secret.

Figure 4:
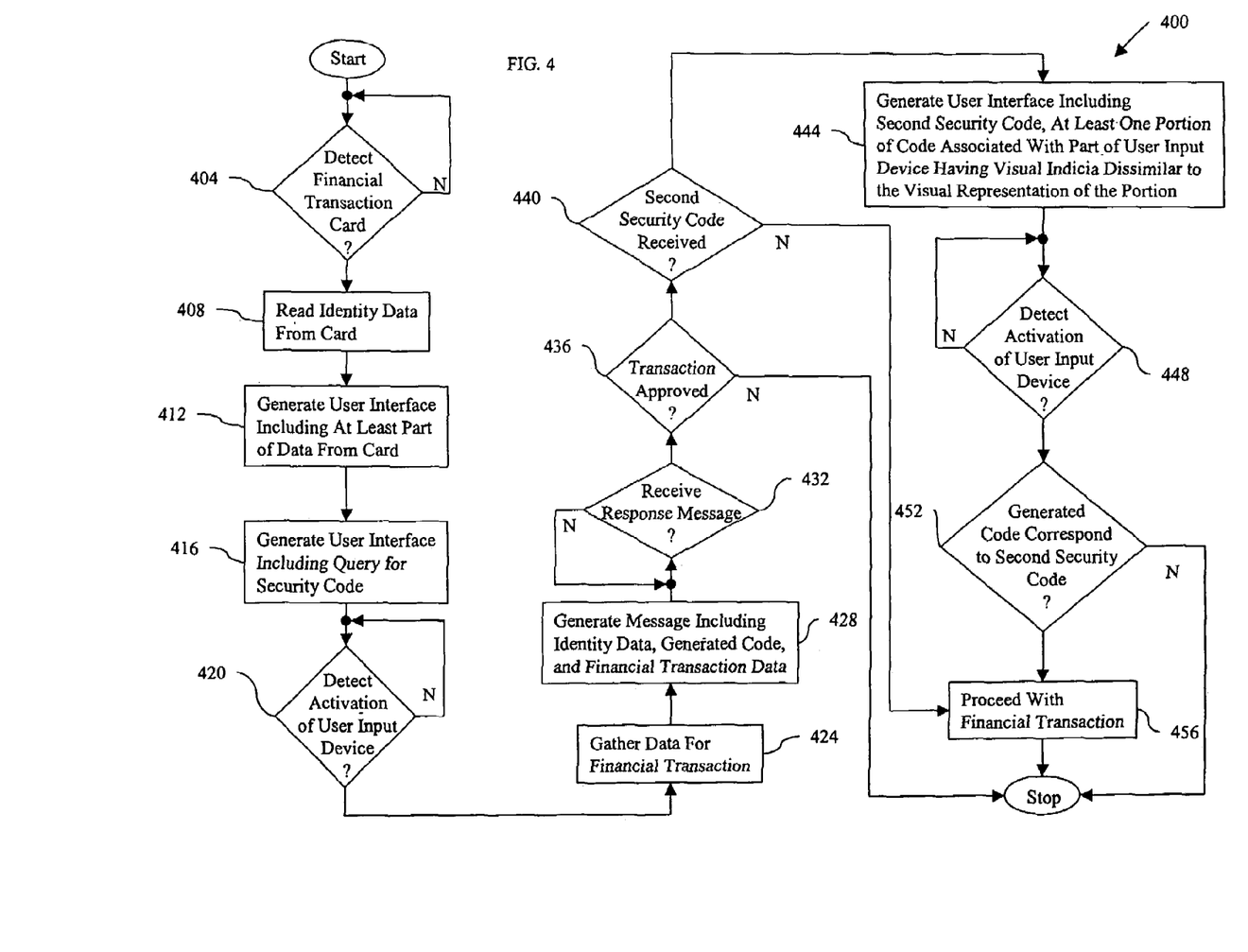
FIG. 4 is a flow chart illustrating a process for verifying an electronic financial transaction.

FIG. 4 is a flow chart illustrating a process 400 for verifying an electronic financial transaction. Process 400 could describe the operations of a remote financial transaction station similar to remote financial transaction station 110 of FIG. 1.

The process begins with the remote financial transaction station waiting to detect a financial transaction card (step 404). The financial transaction card may be an ATM card, a debit card, a smart card, or any other type of device that stores information. The card may be detected, for example, by a card reader.

The remote financial transaction station then reads identity data from the card (step 408). The data may be in the form of raised lettering, a magnetic strip, or any other appropriate format and may be read by any appropriate type of device. In particular implementations, the data includes the card owner's name and account number.

After acquiring the data, the remote financial transaction station generates and displays a user interface that includes at least part of the data from the card (step 412). For example, the user interface could include the card owner's name.

The remote financial transaction station next generates and displays a user interface that includes a query for a security code (step 416). The security code may be a sequence of numerals, for example.

The remote financial transaction station then waits to detect activation of a user input device in a manner that generates a code (step 420). The user input device could be a numeric keypad, for example. In certain implementations, the station waits for a certain number of symbols to be entered.

After detecting activation of the user input device, the station gathers data for the financial transaction (step 424). Gathering such data may include, for example, querying and waiting for entry of transaction type (e.g., withdrawal, deposit, or transfer) and amount.

Upon gathering the financial transaction data, the station generates a message including the identity data, the generated code, and the financial transaction data (step 428). The station then sends the message to a financial transaction manager and waits to receive a transaction response message (step 432).

Upon receiving a transaction response message, the station determines whether the financial transaction was approved (step 436). If the transaction was not approved, the process ends. If, however, the transaction was approved, the station determines whether a second security code was received (step 440).

If a second security code was not received, which may occur if a transaction does not require a second security code, if a card owner does not have a second security code, or otherwise, the station proceeds with the financial transaction (step 456). For example, the station may dispense money and generate and send a message indicating that the transaction was completed. The process then ends. If, however, a second security code was received, the station generates and displays a user interface including the second security code and associates at least one portion of the code with a part of a user input device having visual indicia dissimilar to the visual representation of the portion (step 444). For example, the numerals in a numeric code may be associated with the function selection keys of an ATM.

The remote financial transaction station then waits to detect activation of the user input device in a manner that generates a code (step 448). The user input device may include a keypad having non-numeric, or even unassigned, indicia. In certain implementations, the station waits for a certain number of symbols.

Upon detecting activation of the user input device, the remote financial transaction station determines whether the generated code corresponds to the second security code (step 452). If the detected code does not correspond to the second security code, the process ends. If, however, the detected code does correspond to the second security code, the remote financial transaction station proceeds with the financial transaction (step 456), as discussed previously. The process then ends.

The verification technique illustrated by process 400 has a variety of features. For example, the technique may be readily implemented in existing remote financial transaction stations, such as, for example, ATMs, because hardware changes, if any, would probably be minimal and the required software changes would be easily implemented by the current operating systems, such as, for example, OS-2 and Microsoft™ Windows™. Of course, financial institutions, such as, for example, banks, implementing the technique may have to determine if their card owners would still be able to use the remote financial transaction stations of other instructions in which the technique was not implemented.

Furthermore, financial institutions that implemented the technique could be viewed as innovators. Moreover, it may provide a reason for card owners to seek out the offering financial institution's remote financial transaction stations, as financial institutions that did not implement the technique would expose card owners to a higher risk of skimming or other nefarious schemes. Thus, the technique may provide a competitive differentiator for a financial institution.

FIG. 4 illustrates one implementation of a process for verifying an electronic financial transaction. Other implementations may include fewer, more, and/or a different arrangement of operations. For example, a financial transaction card may not be necessary to initiate a financial transaction; instead, a user may enter identifying information using, for example, a keyboard or a microphone, such that steps 404-412 may be eliminated. Additionally, the user interfaces including at least part of the data from the card and including a query for a security code may be one user interface, leading to the combination of steps 412-416. As a further example, the second security code may be randomized by the remote financial transaction station before insertion into the user interface. Furthermore, additional symbols that are comparable to the second security code portions may be determined, perhaps randomly, and inserted in the user interface with the second security code portions. As an additional example, the security procedures for the financial transaction may be performed before gathering the financial transaction data. As a further example, receiving and presenting the second security code in the user interface may be the only security technique used, such that steps 412-420 may be eliminated. As another example, the identity data, security code, and/or transaction data may be sent to a financial transaction manager in two or more messages and/or at different times. As an additional example, if a transaction was not approved (step 436), the station may prompt the user for the part of the transaction data that was invalid (e.g., owner identity, security code, or financial transaction data) and/or inform the user of why the transaction was denied. Furthermore, if the detected code does not correspond to the second security code (step 452), the station may station may prompt the user to re-enter the security code (step 444).

Figure 5:
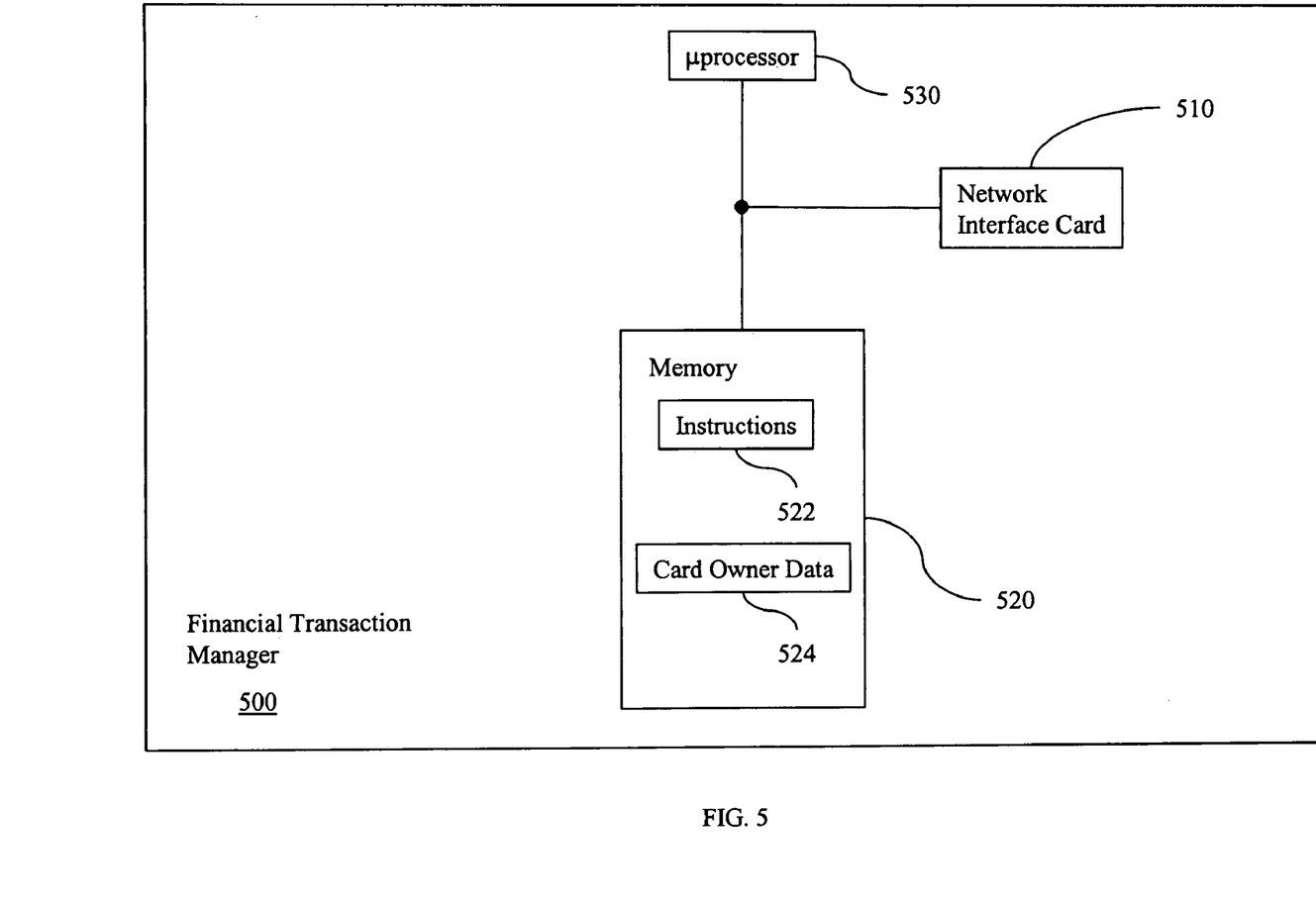
FIG. 5 is a block diagram illustrating a financial transaction manager.

FIG. 5 illustrates a financial transaction manager 500 similar to financial transaction manager 130 in FIG. 1. As illustrated, manager 500 includes a network interface card 510, memory 520, and a microprocessor 530. Network interface card 510 may be an Ethernet card, an Asynchronous Transfer Mode card, or any other appropriate device for sending messages to and receiving messages from a remote financial transaction station. Memory 520 may include RAM, ROM, CD-ROM, registers, and or any other type of volatile or non-volatile information storage device. Memory 520 stores instructions 522 that are responsible for the financial transaction operations of manager 500, and card owner data 524 that includes identity data and security codes for financial transaction card owners. Card owner data 524 may be in the form of a database. Microprocessor 530 may be a CISC processor, a RISC processor, or any other appropriate device for manipulating information in a logical manner. Microprocessor 530 operates, at least in part, according to instructions 522.

In one mode of operation, financial transaction manager 500 waits to receive a message that includes card owner identity data and a security code through network interface card 510. Such a message usually indicates that an electronic financial transaction has been initiated. Upon receiving such a message, microprocessor 530 searches card owner data 524 to determine whether there is card owner data associated with the identity data. If there is card owner data associated with the identity data, microprocessor 530 determines whether the received security code corresponds to a security code included in the associated card owner data. If the codes do not correspond, the microprocessor generates a message indicating that the security code is not valid, and the message is sent through network interface card 510. If, however, the codes correspond, the microprocessor generates a message indicating that the security code is valid, and the message is sent through network interface card 510.

Microprocessor 530 also determines whether there is a second security code required for the electronic financial transaction, with the second security code to be presented in a user interface where each code portion is associated with a different part of a user input device, as discussed previously. This determination may be accomplished by, for example, searching for a second security code in the card owner data, finding an indicator in the card owner data, or otherwise. If a second security code is required, microprocessor 530 retrieves the second security code from card owner data 524 and generates a message including the second security code. The message may then be sent through network interface card 510.

Figure 6:
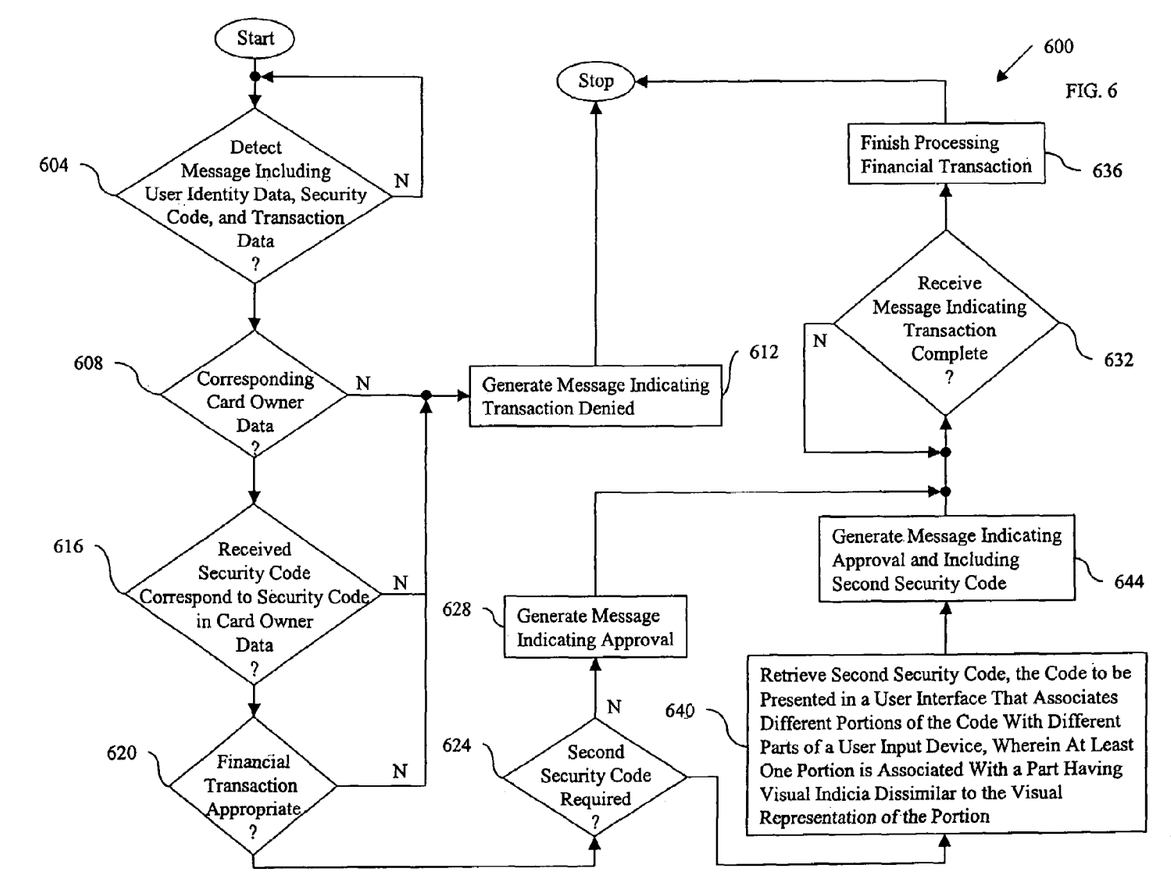
FIG. 6 is a flow chart illustrating a process for verifying an electronic financial transaction.

FIG. 6 illustrates a process 600 for verifying an electronic financial transaction. Process 600 describes one implementation of the operations of a financial transaction manager similar to financial transaction manager 130 of FIG. 1 or financial transaction manager 500 of FIG. 5.

The method begins with the financial transaction manager waiting to detect an electronic financial transaction initiation message including user identity data, a security code, and financial transaction data (step 604). After detecting such a message, the manager determines whether there is card owner data that corresponds to the identity data (step 608). The manager may accomplish this, for example, by examining a database of card owner data, querying other financial transaction managers through an interchange, or using any other appropriate technique.

If there is no card owner data that corresponds to the identity data, the manager generates a message indicating that the transaction was denied (step 612). The message may also indicate why the transaction was denied. The manager then sends the message to the remote financial transaction station that initiated the request, and the process ends.

If, however, there is card owner data that corresponds to the identity data, the manager determines whether the received security code corresponds to a security code in the card owner data (step 616). This may be accomplished, for example, by determining whether the received security code matches a security code in the card owner data.

If the received security code does not correspond to a security code in the card owner data, the manager generates and sends a message indicating that (and, optionally, why) the transaction was denied (step 612), and ends the process as discussed above.

If, however, the received security code corresponds to a security code in the card owner data, the manager determines whether the financial transaction is appropriate (step 620). A financial transaction may be appropriate, for example, if there are sufficient funds for the transaction or if the transaction is of a type allowed for the account.

If the financial transaction is not appropriate, the manager generates and sends a message indicating that (and, optionally, why) the transaction was denied (step 612), and ends the process as discussed above.

If, however, the financial transaction is appropriate, the manager determines whether a second security code is required for the financial transaction (step 624). A second security code may be required, for example, if a second security code is present in the card owner data, if a second security code indicator is set in the card owner data, or if a second security code is required for a specific type of financial transaction.

If a second security code is not required, the manager generates a message indicating approval of the financial transaction (step 628). The manager then sends the message to the initiating remote financial transaction station and waits to receive a message indicating that the transaction is complete (step 632). Upon receiving such a message, the manager finishes processing the financial transaction (step 636), and the process ends.

If, however, a second security code is required (step 624), the manager retrieves the second security code for presentation in a user interface that associates different portions of the code with different parts of a user input device, with at least one portion being associated with a part having visual indicia dissimilar to the visual representation of the portion (step 640). The manager then generates and sends to the initiating remote financial transaction station a message indicating approval of the financial transaction and including the second security code (step 644).

The manager then waits to receive a message indicating that the financial transaction is complete (step 632) and, upon receiving such a message, finishes processing the financial transaction (step 636) and ends the process as discussed above.

FIG. 6 illustrates one implementation of a process for verifying an electronic financial transaction. Other implementations may include fewer, more, and/or a different arrangement of operations. For example, a security code may not be received in an electronic financial transaction initiation message, and the manager may retrieve a security code and generate a message to send the code to, the initiating remote financial transaction station, leading to modification of step 604 and elimination of step 616. As another example, the first security code may not be used for some electronic financial transactions such that steps 616-620 may be eliminated. As an additional example, the manager may randomize the order of the portions of the second security code and insert the randomized order into the message with the second security code. Furthermore, additional symbols that are comparable to the second security code portions may be determined, perhaps randomly, and mixed with the randomized order. As a further example, the process of determining whether a second security code is required may be accomplished before receiving data regarding the electronic financial transaction to be performed.

A number of implementations have been described. Other implementations are within the scope of the following claims.

What is claimed is:

1. A computer-implemented method for verifying an electronic financial transaction, the method comprising:
    generating an interface for display by a display device to a user, the interface comprising portions of a first security code and associating different portions of the first security code with different user-activatable parts of a user input device by locating the portions of the first security code in proximity to respective user-activatable parts of the user input device, wherein a particular portion of the first security code is associated with a corresponding particular one of the user-activatable parts, wherein the particular user-activatable part has a visual indicia having at least one character, wherein the visual indicia is different from a visual representation of the particular portion, and wherein the display device is separate from the user-activatable parts of the user input device;
    detecting activation of a combination of the user-activatable parts of the user input device in a manner that generates a code; and
    determining whether the code generated by activation of the combination of the user-activatable parts corresponds to the first security code.

2. The method of claim 1, wherein the first security code is a sequence of numerals.

3. The method of claim 1, wherein generating the interface comprises inserting the portions of the first security code in a random order in the interface.

4. The method of claim 3, wherein the order of the portions of the first security code changes each time the interface is generated.

5. The method of claim 1, wherein generating the interface comprises inserting, in the interface, symbols that are comparable to the portions of the first security code but that are not part of the first security code, wherein the symbols are associated with respective user-activatable parts of the user input device that are different from the user-activatable parts associated with the respective portions of the first security code.

6. The method of claim 1, further comprising:
    detecting a financial transaction card;
    causing display by the display device of a query for a second security code;
    detecting activation of a second combination of the user-activatable parts of the user input device responsive to the query in a manner that generates a second code;
    generating a message to have the generated second code validated;
    receiving a response message responsive to the generated message, wherein the response message contains the first security code and an indication approving the financial transaction, wherein generating the interface comprising the portions of the first security code is performed in response to the response message containing the first security code.

7. The method of claim 6, wherein the financial transaction card comprises a magnetic strip storing card owner identity data.

8. A system for verifying an electronic financial transaction, the system comprising:
    a display device operable to display a user interface;
    a user input device comprising user-activatable parts operable in response to user activation to generate a code, wherein the display device is separate from the user-activatable parts of the user input device; and
    a processor configured to:
        generate the user interface comprising portions of a first security code, the user interface associating different portions of the first security code with different user-activatable parts of the user input device by locating the portions of the first security code in proximity to respective user-activatable parts of the user input device, wherein a particular portion of the first security code is associated with a corresponding particular one of the user-activatable parts, wherein the particular user-activatable part comprises a visual indicia having at least one character, and wherein the visual indicia is different from a visual representation of the particular portion, and
        determine whether the code generated by the user activation of a combination of the user-activatable parts corresponds to the first security code.

9. The system of claim 8, wherein the processor is further configured to insert the portions of the first security code in a random order in the user interface.

10. The system of claim 9, wherein the order of the portions of the first security code changes each time the interface is generated.

11. The system of claim 9, wherein the processor is further configured to randomize the order of the first security code portions in the user interface.

12. The system of claim 8, wherein the user-activatable parts comprise Automated Teller Machine function selection keys.

13. The system of claim 8, further comprising a card reader for detecting and reading a financial transaction card, wherein the processor is further configured to:
   cause display, in the display device, of a query for a second security code,
   detect activation of a second combination of the user-activatable parts of the user input device responsive to the query in a manner that generates a second code;
   generate a message to have the generated second code validated,
   receive a response message in response to the generated message, wherein the response message contains the first security code and an indication approving the financial transaction, wherein the user interface comprising the portions of the first security code is generated in response to the response message containing the first security code.

14. An article of manufacture comprising a machine-readable medium storing instructions operable to cause one or more machines to perform operations comprising:
   causing display of a query for a first security code relating to a transaction;
   in response to input received at a user input device corresponding to the first security code, generating a message containing the first security code;
   receiving a response message responsive to the generated message, the response message containing a second security code and an indication of approval of the transaction;
   in response to the response message containing the second security code, generating an interface for presentation to a user, the interface comprising portions of the second security code and associating different portions of the second security code with different user-activatable parts of the user input device by locating the portions of the second security code in proximity to respective user-activatable parts of the user input device, particular portion of the second security code being associated with a corresponding particular one of the user-activatable part-having-parts, wherein the particular user-activatable part has visual indicia dissimilar to a visual representation of the particular portion;
   detecting activation of a combination of the user-activatable parts of the user input device in a manner that generates a code; and
   determining whether the code generated by activation of the combination of the user-activatable parts corresponds to the second security code.

15. The article of claim 14, wherein generating the interface comprises inserting portions of the second security code in a random order in the interface.

16. The article of claim 15, wherein the order of the portions of the second security code changes each time the interface is generated.

17. The article of claim 14, wherein generating the interface comprises inserting symbols in the interface that are comparable to the portions of the second security code but that are not part of the second security code, wherein the symbols are associated with respective user-activatable parts of the user input device different from the user-activatable parts of the user input device associated with the portions of the second security code.

18. The article of claim 14, wherein the instructions are further operable to cause one or more machines to perform operations comprising:
   detecting a financial transaction card;
   wherein causing display of the query is in response to detecting the financial transaction card.

19. A computer-implemented method for verifying an electronic financial transaction, the method comprising:
   receiving a message, from a station, comprising identity data for the electronic financial transaction;
   retrieving a security code associated with the identity data, the security code for presentation in a user interface that associates different portions of the security code with different user-activatable parts of a user input device by locating the portions of the security code in proximity to respective user-activatable parts of the user input device, wherein a particular portion of the security code is associated with a particular one of the user-activatable parts, wherein the particular user-activatable part has visual indicia dissimilar to a visual representation of the particular portion;
   sending a message including the security code to the station that includes the user input device and a display device to present the user interface, wherein the message is to cause the station to display the user interface in the display device and to receive activation of the user-activatable parts corresponding to the security code to authorize the financial transaction.

20. The method of claim 19, further comprising:
   randomizing an order of the portions of the security code; and
   inserting the randomized order into the message along with the security code.

21. The method of claim 20, further comprising inserting symbols that are comparable to the portions of the security code but that are not part of the security code into the randomized order.

22. The method of claim 19, further comprising determining whether the security code is required, wherein the message is sent in response to determining that the security code is required.

23. A system for verifying an electronic financial transaction, the system comprising:
   a memory operable to store identity data for card owners and associated security codes;
   a communication interface operable to receive, from a station, a message comprising identity data for the electronic financial transaction; and
   a processor configured to:
      retrieve a security code associated with the identity data, the security code for presentation in a user interface that associates different portions of the security code with different user-activatable parts of a user input device by locating the portions of the security code in proximity to respective user-activatable parts of the user input device, wherein a particular portion of the security code is associated with a particular one of the user-activatable parts of the user input device, wherein the particular user-activatable part has a visual indicia dissimilar to a visual representation of the particular portion, and send a message including the security code to the station that includes the user input device and a display device to present the user interface, wherein the message is to cause the station to display the user interface in the display device and to receive activation of the user-activatable parts corresponding to the security code to authorize the financial transaction.

24. The system of claim 23, wherein the processor is further configured to:

randomize an order of the portions of the security code; and insert the randomized order into the message along with the security code.

25. The system of claim 24, wherein the processor is further configured to insert symbols that are comparable to the portions of the security code but that are not part of the security code into the randomized order.

26. The system of claim 23, wherein the processor is further configured to determine whether the security code is required, wherein the message is sent in response to determining that the security code is required.

27. An article of manufacture comprising a machine-readable medium storing instructions operable to cause one or more machines to perform operations comprising:

detecting a message, from a station, comprising identity data for an electronic financial transaction;

retrieving a security code associated with the identity data, the security code for presentation in a user interface that associates different portions of the security code with different user-activatable parts of a user input device by locating the portions of the security code in proximity to respective user-activatable parts of the user input device, wherein a particular portion of the security code is associated with a corresponding particular one of the user-activatable parts of the user input device, wherein the particular user-activatable part has visual indicia dissimilar to a visual representation of the particular portion; and send a message including the security code to the station that includes the user input device and a display device to present the user interface, wherein the message is to cause the station to display the user interface in the display device and to receive activation of the user-activatable parts corresponding to the security code to authorize the financial transaction.

28. The article of claim 27, wherein the instructions are further operable to cause one or more machines to perform operations comprising:

randomizing an order of the portions of the security code; and inserting the randomized order into the message along with the security code.

29. The article of claim 28, wherein the instructions are further operable to cause one or more machines to perform operations comprising inserting symbols that are comparable to the portions of the security code but that are not part of the security code into the randomized order.

30. The article of claim 27, wherein the instructions are further operable to cause one or more machines to perform operations comprising determining whether the security code is required, wherein the message is sent in response to determining that the security code is required.

31. A system for verifying an electronic financial transaction, the system comprising:

a remote financial transaction station operable to:

detect a financial transaction card comprising a magnetic strip storing card owner identity data, read the data from the card, cause display of a query for a first security code, detect activation of user-activatable parts of a user input device in a manner that generates a security code, generate a message comprising card owner identity data and the generated security code, receive a response message, determine whether the generated security code was validated, if the generated security code was validated, determine whether a second security code was received in the response message, if the second security code was received, generate a user interface comprising:

the second security code, the user interface associating different portions of the code with different user-activatable parts of the user input device by locating the portions of the second security code in proximity to respective user-activatable parts of the user input device, a particular portion of the second security code being associated with a particular one of the user-activatable parts of the user input device, wherein the particular user-activatable part has visual indicia dissimilar to a visual representation of the particular portion, the portions of the second security code being in a random order in the user interface, and symbols that are comparable to the portions of the second security code but that are not part of the second security code, wherein the symbols are associated with respective user-activatable parts of the user input device that are different from the user-activatable parts associated with the portions of the second security code, detect activation of the user input device in a manner that generates a second code, and determine whether the second generated code corresponds to the second security code; and a financial transaction manager operable to:

receive the message comprising card owner identity data and the generated security code, determine whether the generated security code is valid by examining a card file, if the generated security code is valid, determine whether the second security code is required, if the second security code is required, retrieve the second security code, the second security code associated with the identity data, randomize the order of the portions of the second security code, insert into the randomized order the symbols that are comparable to the portions of the second security code but that are not part of the second security code, and generate the response message including the second security code and the randomized, symbol-inserted version of the second security code.

32. The method of claim 5, wherein the symbols and first security code portions are from a set of symbols, and fewer than all of the symbols from the set are inserted in the interface.

33. The method of claim 32, wherein the symbol set includes numerical digits.

34. The article of claim 17, wherein the symbols and second security code portions are from a set of symbols, and fewer than all of the symbols from the set are inserted in the interface.

35. The article of claim 34, wherein the symbol set includes numerical digits.

36. The method of claim 21, wherein the symbols and security code portions are from a set of symbols, and fewer than all of the symbols from the set are inserted in the user interface.

37. The method of claim 36, wherein the symbol set includes numerical digits.

38. The system of claim 25, wherein the symbols and security code portions are from a set of symbols, and fewer than all of the symbols from the set are inserted in the user interface.

39. The system of claim 38, wherein the symbol set includes numerical digits.

40. The article of claim 29, wherein the symbols and security code portions are from a set of symbols, and fewer than all of the symbols from the set are inserted in the user interface.

41. The article of claim 40, wherein the symbol set includes numerical digits.

42. The method of claim 19, wherein the message comprising the identity data is received in response to user entry of a second security code at the station, the method further comprising:
   verifying whether the second security code is valid, wherein the retrieving and sending are performed in response to verifying that the second security code is valid.

43. The system of claim 23, wherein the message comprising the identity data is received in response to user entry of a second security code at the station, the processor configured to further:
   verify whether the second security code is valid, wherein the retrieving and sending are performed in response to verifying that the second security code is valid.

44. The article of claim 27, wherein the message comprising the identity data is received in response to user entry of a second security code at the station, the operations further comprising:
   verifying whether the second security code is valid, wherein the retrieving and sending are performed in response to verifying that the second security code is valid.

* * * * *

UNITED STATES PATENT AND TRADEMARK OFFICE
CERTIFICATE OF CORRECTION

PATENT NO. : 7,725,388 B2 Page 1 of 1
APPLICATION NO. : 10/430361
DATED : May 25, 2010
INVENTOR(S) : Mark Wilkinson

It is certified that error appears in the above-identified patent and that said Letters Patent is hereby corrected as shown below:

In column 13, line 50, in Claim 14, before "particular" insert -- a --.

In column 13, line 53, in Claim 14, delete "part-having-parts," and insert -- parts, --, therefor.

Signed and Sealed this

Twenty-fourth Day of August, 2010

David J. Kappos
*Director of the United States Patent and Trademark Office*